United States Patent [19]

Amberg et al.

[11] 3,995,740
[45] * Dec. 7, 1976

[54] NESTABLE FABRICATED THERMOPLASTIC CONTAINER

[75] Inventors: Stephen W. Amberg, St. James; Thomas E. Doherty, Setauket, both of N.Y.

[73] Assignee: Owens-Illinois, Inc., Toledo, Ohio

[ * ] Notice: The portion of the term of this patent subsequent to Dec. 17, 1991, has been disclaimed.

[22] Filed: May 28, 1974

[21] Appl. No.: 473,998

Related U.S. Application Data

[62] Division of Ser. No. 211,259, Dec. 31, 1971, Pat. No. 3,854,583.

[52] U.S. Cl. .............................. 206/520; 229/1.5 B; 229/48 T
[51] Int. Cl.² ...................... B65D 3/06; B65D 21/02
[58] Field of Search .......... 206/519, 520; 229/15 B, 229/487

[56] References Cited
UNITED STATES PATENTS

| 759,029 | 5/1904 | Shea | 229/1.5 B |
|---|---|---|---|
| 2,969,901 | 1/1961 | Behrens | 229/1.5 B |
| 3,027,044 | 3/1962 | Winstead | 220/63 R |
| 3,104,045 | 9/1963 | Bruschini | 229/1.5 B |
| 3,215,325 | 11/1965 | Shappell | 229/1.5 B |
| 3,322,318 | 5/1967 | Felton | 229/3.5 R |
| 3,363,820 | 1/1968 | Schilling | 229/1.5 B |
| 3,375,954 | 4/1968 | Honkanen | 206/520 |
| 3,468,467 | 9/1969 | Amberg | 229/1.5 B |
| 3,664,568 | 5/1972 | Mac Daniel | 229/1.5 B |

*Primary Examiner*—George E. Lowrance
*Attorney, Agent, or Firm*—E. J. Holler; Thomas A. Meehan

[57] ABSTRACT

A fabricated cup or other nestable container in which the sidewall is formed from a rectangular sheet-like blank of a thermoplastic material, particularly an expanded thermoplastic material, the blank having its ends joined to one another in a liquid-tight seam extending the full height thereof to form a sleeve, the blank having a relatively high degree of orientation or heat-shrinkability extending circumferentially of the sleeve, the fabrication of the sidewall from the sleeve being accomplished by telescoping the sleeve over a generally frusto-conically shaped mandrel, by exposing the sleeve to heat to cause it shrink to conform to the configuration of the mandrel and by stripping the shrunken sleeve from the mandrel. A two-piece container may also be formed from such a sidewall by affixing an end closure element to the bottom or smaller end of the sidewall. A one-piece container may also be formed in this manner by using a blank of sufficient height so that a substantial portion of the sleeve formed therefrom extends beyond the smaller end of the forming mandrel, such substantial portion, when the sleeve is exposed to heat, being shrinkable to form an annular planar portion disposed transversely of the longitudinal axis of the mandrel and a relatively small tubulation which extends longitudinally from the interior of the annular planar portion and which, by the application of pressure thereto while at elevated temperature, may be caused to collapse and fuse together to close the bottom of the container in a liquid-tight manner. A container of this type may be used to advantage to contain any liquid or other fluent product therein in face to face contact with the interior surface of the sidewall thereof, and when the container is fabricated from an expanded material, because of the insulating characteristics of such material, a container fabricated therefrom may be used to particular advantage as a handholdable cup for coffee or other hot beverage.

17 Claims, 10 Drawing Figures

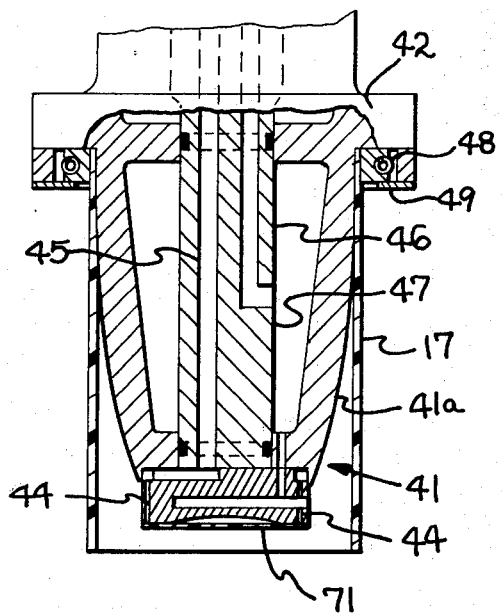
FIG. 6
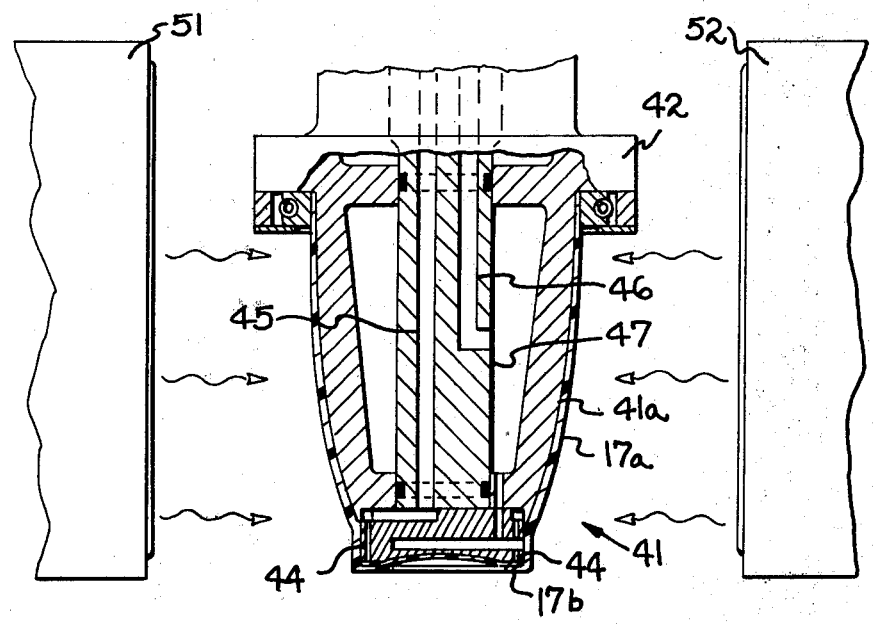
FIG. 7
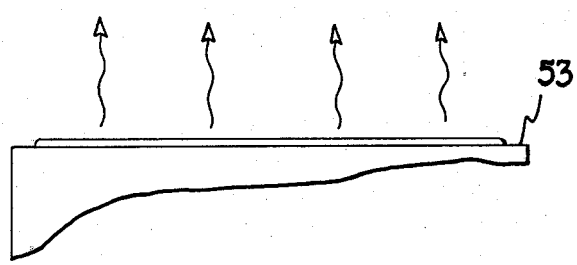

NESTABLE FABRICATED THERMOPLASTIC CONTAINER

This is a division of application Ser. No. 211,259, filed Dec. 31, 1971. now U.S. Pat. No. 2,854,583.

GENERAL DESCRIPTION OF THE INVENTION

It has long been recognized that drinking cups and other nestable containers with superior properties, especially for the retention of hot beverages such as coffee, can be formed from expanded thermoplastic materials, the most popular of which has proven to be expanded polystyrene. A very popular cup of this type is a one-piece cup which is molded directly from expandable polystyrene beads in a steam chest. However, in forming cups in this manner, it has proven to be necessary, for purposes of imparting adequate strength, rigidity and liquid impermeability to the sidewall theoref, to construct such cups with a thick sidewall, at least in relationship to the sidewall thickness of other types of insulated cups. As a consequence of this added sidewall thickness, it is not possible to obtain as small a stacking height, or spacing, between like cups in a nested stack thereof, with the result that such cups require considerably more storage space than a comparable quantity of other types of nestable insulated cups. Another disadvantage of the so called steam chest molded cup is that, as an inherent consequence of its mode of manufacture, the external surface of its sidewall can only be decorated by post decorating or printing techniques which are slower and more expensive. that the flexographic and other sheet printing techniques which may be used in decorating cups fabricated from pre-printed sheet. As a result, the vast majority of such steam chest molded cups which appear in the market place do not contain a decorated or printed outer surface.

Another known type of insulated or expanded thermoplastic drinking cup which has enjoyed some measure of commercial popularity is a two-piece cup such as that which is manufactured and marketed by the assignee of this application under the trademark "X-Fome" and which corresponds to the cup described in U.S. Pat. No. 3,468,467 which is assigneed to the assignee of this application. The sidewall of such cup may be formed by conventional cup fabricating techniques from a crescent-shaped blank of an expanded plastic material, which, in turn, is cut from a pre-printed sheet or web of indefinite length thereof. By controlling the density of such sheet, it is possible to fabricate a cup with adequate strength, rigidity and liquid impermeability and which, nonetheless, has a considerably thinner sidewall than a steam chest molded cup for superior stacking or nesting properties in relationship thereto. Also, the ease with which the exterior of the sidewall of such cups can be provided with attractive decoration by pre-decorating the sheet from which the sidewall blanks are formed, has made it possible for a substantial portion of such cups to be decorated in a way which has proven to be quite popular in the trade. One of the drawbacks of such a cup is its costliness, at least insofar as material costs are concerned, in relationship to the steam chest molded cup, due in part to the scrap which is inherently formed when a crescent shaped sidewall blank is cut from a sheet or web of normal character.

Yet another known type of insulated or expanded thermoplastic drinking cup which has also enjoyed some measure of commercial popularity is a one-piece, seamless deep drawn cup which is manufactured and marketed by the assignee of this application under the designation VP-7 and which corresponds to the cup described in co-pending U.S. patent application Ser. No. 555,922 (J. R. Tiffin et al.), now U.S. Pat. No. 3,666,162. Such cups can, in somewhat higher densitites than conventional steam chest molded cups, be formed to very close manufacturing tolerances and with very low stacking height, and because of these features, they have, in spite of somewhat more costliness than the steam chest molded cup and the two-piece cup described above, and in spite of the fact that they can only be decorated after forming, gained a substantial measure of popularity in the coin-operated beverage vending machine market.

As can be seen from the foregoing discussion, each of known types of insulated cups referred to therein has certain advantages which makes it well-suited for some uses, and certain limitation which makes it less-suited than one of the other types for other uses. In accordance with the present invention, however, there is provided an insulated cup which combines a wide range of desirable properties, without offsetting limitations, and which is, therefore, well-suited for a wide range of applications for insulated cup. The sidewall of such cup can be formed from rectangular blanks, and therefore without the scrap and inherent expense involved in the severing of crescent-shaped sidewall blanks from a parent sheet or web, and the sidewall of such a cup may be relatively inexpensively provided with attractive, high quality decorative material. Additionally, such cup may be provided with relatively good stacking or nesting characteristics, and with close manufacturing tolerances to provide the reliable denesting which is important in coin-operated vending machine utilization of cups. Relatively inexpensive high quality cups according to the present invention may readily be formed on a high production basis in either a one-piece version or a two-piece version.

The sidewall of either such version is formed from a web of polystyrene or other thermoplastic polymeric sheet material which has a substantial degree of orientation or heat-shrinkability in the machine direction, by severing rectangular sidewall blanks from such web, preferably after printing or other decorative material is applied to the web by flexographic or similar printing technique in a repeat pattern in registration with the blanks to be cut therefrom, by forming a cylindrical sleeve from each such blank with the machine direction of the parent web extending circumferentially thereof, including the forming of a liquid tight lapped seam between the ends of the sleeve, as by heat sealing, by placing the sleeve over a forming mandrel having an outer forming surface corresponding to the desired configuration of the inner surface of the sidewall of the nestable cup to be formed therefrom, by heating the sleeve while it is so positioned over the mandrel to cause it to heat shrink into conforming face to face contact with the forming surface of the mandrel, and by stripping the shrunken sleeve from the mandrel. A separate bottom closure may be affixed to a sidewall formed in this manner either while the sleeve is still in position on the mandrel, or after it is removed, by any of several known cup-manufacturing techniques. Alternatively, a one-piece cup may be formed by starting with a sleeve which is highly oriented in the circumferential direction and which exceeds the height of the forming mandrel over which it is to be telescoped by a distance of the order of one-half of the smaller diameter of such mandrel, with the sleeve being so telescoped over the mandrel that the excess portion of the sleeve extends beyond the smaller end of the mandrel. When such a sleeve is exposed to heat, the excess portion thereof will shrink to form a annular planar portion extending inwardly across the smaller end of the mandrel and a relatively small diameter tubulation extending longitudinally from the interior of such planar portion. By the application of opposed compressive forces to such tubulation while it is at elevated temperature, it can be caused to collapse and to fuse together to close the interior of the annular planar portion in a liquid-tight fashion.

The fabrication of either a two-piece cup or a one-piece cup according to the present invention is effective to provide a cup whose sidewall thickness increases from a lesser thickness at a location of lesser diameter. This is especially desirable in that it provides adequate thickness in the lower portion of the cup to protect the hand of a user from the temperature of a hot beverage therein, while keeping the wall thin at the top of the container so that the bead or rim which is normally formed therein need not be excessively thick. Also, the degree of taper in the sidewall can readily be increased in the lower thicker regions to offset the adverse effect of a thicker sidewall on the stacking or nesting characteristics of like cups of this type.

Accordingly, it is an object of the present invention to provide an improved nestable cup or similar container in which the sidewall is fabricated from a sheet of thermoplastic material.

More particularly, it is an object of the present invention to provide an improved nestable cup at least the sidewall of which is fabricated from a sheet of expanded thermoplastic material to reduce the weight and cost thereof and to improve the insulating properties thereof.

More particularly, it is an object of the present invention to provide a nestable cup or similar container at least the sidewall portion of which can be fabricated from a rectangular blank of heat-shrinkable thermoplastic material.

More particularly, it is an object of the present invention to provide an insulated nestable cup or similar container at least the sidewall portion of which can be fabricated from a rectangular blank of expanded heat-shrinkable thermoplastic material.

More particularly, it is an object of the present invention to provide an insulated nestable cup or similar container which has a relatively thin wall for good stacking characteristics and which can be fabricated from a pre-printed blank of expanded thermoplastic material so that the externl surface of the sidewall of such cup or container carries attractive decorative material.

It is further object of the present invention to provide an insulated nestable cup or similar container in which the thickness of the sidewall thereof varies from a lesser thickness at an upper, larger portion to a greater thickness at a lower, smaller portion, and it is a corollary object to provide such a cup or container with a sidewall taper that varies from a lesser taper at the upper, larger portion to a greater taper at the lower, smaller portion.

It is a further object of the present invention to provide a novel method of fabricating the sidewall of an insulated nestable cup or similar container.

It is also an object of the present invention to provide a method for thermally fabricating the sidewall of a nestable cup or similar container from a rectangular blank of thermoplastic material and without the need for wasting a portion of the material in such blank, and, more particularly, it is an object of the present invention to provide a method for thermally fabricating the sidewall of such a cup or container from a rectangular blank of an expanded thermoplastic material to impart good insulating properties to such sidewall.

More particularly, it is an object of the present invention to provide methods of producing one-piece and two-piece externally decorated insulated cups wih good stacking characteristics and on an economical basis.

For a further understanding of the present invention and the objects thereof, attention is directed to the drawing, the following description thereof, the detailed description of the invention and the appended claims.

DESCRIPTION OF THE DRAWING

FIGS. 4–8 are schematic views illustrating sequential steps in the fabricating of a two-piece container of the type shown in FIG. 1 from a blank of the type shown in FIG. 3.

DETAILED DESCRIPTION OF THE INVENTION

Figure 1:
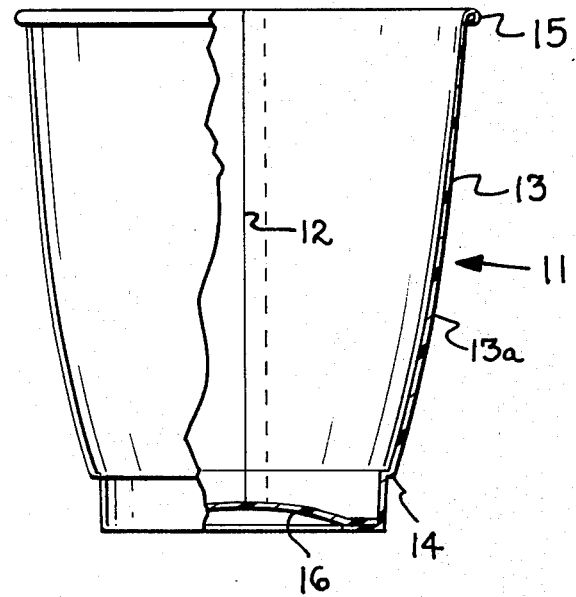
FIG. 1 is an elevation view, partly in section, of a nestable insulated container in accordance with the present invention.
Figure 2:
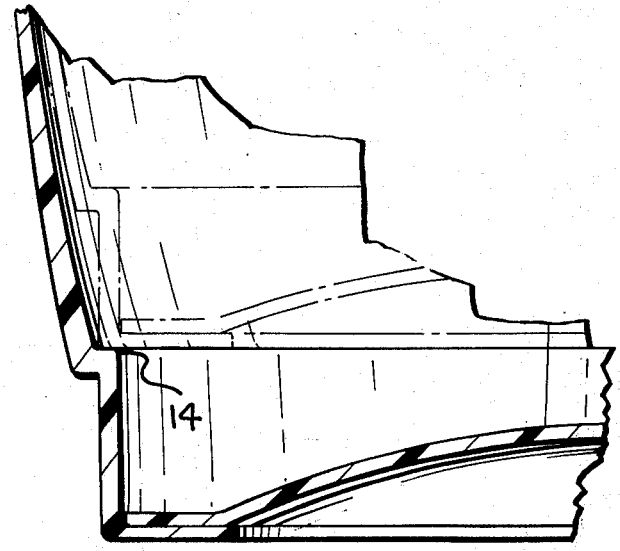
FIG. 2 is a fragmentary sectional view, at an enlarged scale, of a cup in accordance with FIG. 1, showing a like cup in phantom to illustrate the stacking relationship therebetween.

While nestable insulated cups in accordance with the present invention can be constructed in a wide variety of configurations, the presently preferred embodiment of such cup, as is shown generally by reference character 11 in FIGS. 1 and 2, comprises a two-piece cup. Cup 11 is formed, as will be hereinafter described more fully, by heat shrinking an open-ended cylindrical sleeve about a forming mandrel which has an outer forming surface corresponding to the desired contour of the inside surface of the sidewall of the cup, the sleeve having a relatively high degree of orientation in the direction extending circumferentially thereof. Such a sleeve is formed, in accordance with the preferred embodiment of the method of the present invention and as will be hereinafter described more fully, by heat sealing or otherwise joining the opposed lapped ends of a rectangular blank of suitable material in a vertically extending liquid tight seam, and as a consequence of such method of forming, cup 11 will have a visible, vertically extending side seam 12 in the sidewall of the cup, which sidewall is identified by reference character 13.

Sidewall 13 of cup 11 has a major uninterrupted portion 13a, shown as extending from the top of the cup to an inwardly extending stacking shoulder 14 which is located near the bottom of the cup, and which is provided to receive the botttom of a like cup inserted therein to provide a positive minimum spacing between nested or stacked cups, as is shown in FIG. 2 and as is well understood in the art. Of course, as is also well understood in the art, equivalent stacking means could be provided in the sidewall of the cup at a relatively higher elevation in the sidewall, in which case the major portion of the sidewall would be located below the stacking means. In either such event, because of the heat shrinking step involved in the manufacture thereof, the thickness of the sidewall of the container decreases as the diameter of the cup increases, and adequate thickness may be provided in the region of the sidewall which is normally grasped by the hand of a user to protect or insulate the hand from the heat of a hot beverage such as coffee. At the same time, it is possible to maintain the thickness in the region of the top of the cup at a low enough value to form a thin tight bead, shown as 15 in FIG. 1, surrounding the mouth of the container. Because close nesting of the like cups is adversely affected by increased wall thickness, the major portion 13a of the sidewall of cup 11 is shown as increasing in taper, as measured by the included acute angle between the longitudinal central axis of the cup and a line tangent to the sidewall thereof, as the cup diameter decreases and the wall thickness increases, it being noted that increasing wall taper improves close nesting, as is understood in the art.

The bottom or smaller end of cup 11 is shown as being closed by a generally horizontally extending bottom member 16 which is joined to a sidewall portion 13 in a liquid-tight fashion. In the illustrated embodiment, such bottom member is formed from a disc-like element of a thermoplastic material sealable to and compatible with the material of the sidewall, e.g. the same material as the sidewall. This bottom member is joined in a liquid-tight fashion to an inturned portion of the sidewall of the cup, as by heat-sealing or with an adhesive, as hereinafter described. However, it is also contemplated that such bottom member may be formed integrally with the sidewall of the cup, as is also hereinafter described.

Figure 3:
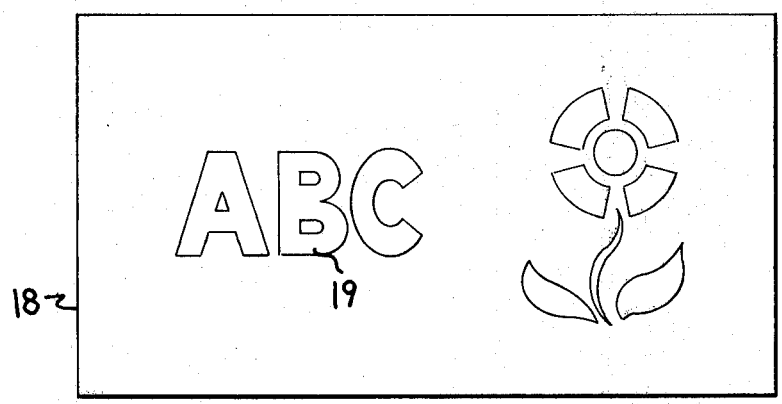
FIG. 3 is a plan view of a rectangular blank from which a cup of the type shown in FIG. 1 can be fabricated.

The sleeve from which a cup of the type shown in FIG. 1 may be formed, which is designated by numeral 17 in FIG. 6, is formed from a rectangular sheet or blank of an expanded plastic material, such as expanded polystyrene, such blank being designated by numeral 18 in FIG. 3. The blank is formed by severing from a parent web or sheet of appropriate material, preferably a web of indefinite length of such material which is highly mono-axially oriented in the longitudinal direction. Such a web may be produced, in turn, by slitting a seamless extruded tube of appropriate thermoplastic material along one or more longitudinally extending line which, if there are more than one, extend parallel to one another. The requisite orientation in the machine direction may readily be imparted to such web, or webs, by engaging the extruded tube while it is at a suitable orientation temperature between opposed counterrotating rolls which are driven at peripheral speeds substantially in excess of the lineal speed of the thermoplastic material leaving the extruder, all as is well understood in the art.

In practice, it is normally desired that blank 17 be provided with printing or other decorative material on the surface which is destined to be the outer surface of the finished cup. For simplicity, decorative material is shown only in FIG. 3 where it is identified by reference character 19, it being understood that it will also be present in other views of the blank, or of the sleeve or cup which are sequentially formed therefrom.

This decorative material may be rapidly and relatively inexpensively applied, in multiple colors if desired, by applying it in a repeat pattern to the parent web before the individual blanks are severed therefrom, as by means of known printing devices such as a flexographic printing press or an offset rotary letter press, all as is well understood in the art. It is to be noted that, because of the differential contraction of the material involved in shrinking a cylindrical sleeve into the form of the sidewall of a nestable cup, the printing should be applied to the web in a form which is distorted from its desired form, so that upon such differential contraction, the printing will change in form into its desired form.

Figure 4:
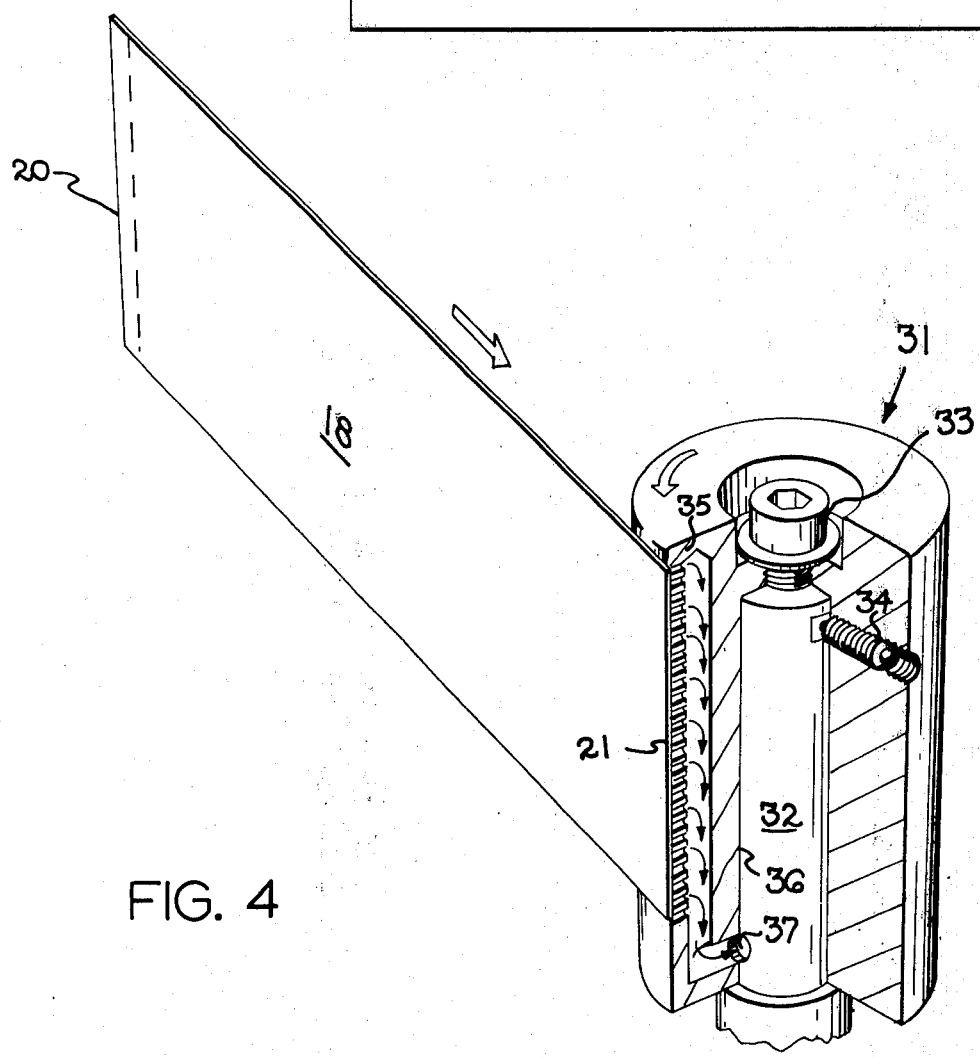
Figure 5:
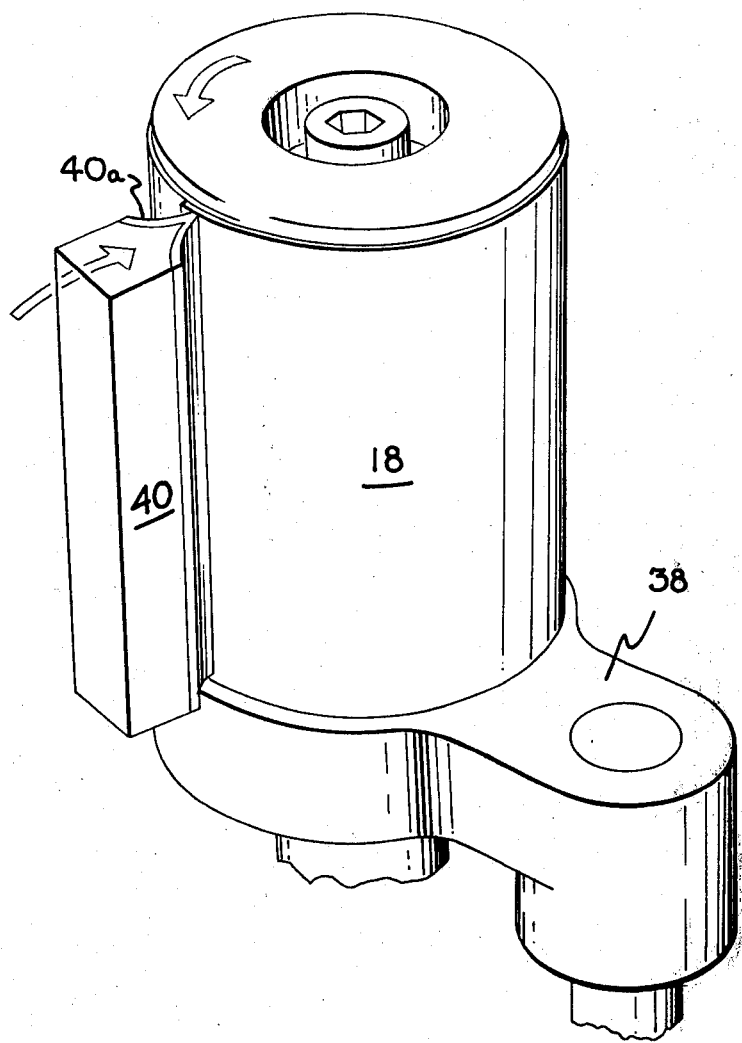

The fabrication of sleeves such as that identified by numeral 17 in FIG. 6 from blanks such as that identified by numeral 18 in FIG. 3 is illustrated in FIGS. 4 and 5. Individual blanks 18 are fed to a rotary mandrel head 31. Mandrel 31 is mounted on shaft 32 and held by collar 33 and set screw 34. Shaft 32 is rotated under power. The blank 18 is held to the mandrel by the vertical row of vacuum ports 35 connected to vertical passage 36 and through radial port 37 into the hollow center passage of shaft 32. The mandrel 31 is concentric with a stripper sleeve 38 carried on a bracket and vertical spindle 39 (FIG. 5). Blank 18 is attached at the leading edge 21 to mandrel 31 by vacuum, and as the mandrel rotates, blank 18 is wrapped around the surface of the cylinder, which is the outer surface of the mandrel 31 to form sleeve 17. The stripper sleeve 38 is in its lowered position out of interference with sleeve 17. The mandrel is the desired size (diameter) in relation to the cup forming mandrel that is to receive the sleeve when finished, as hereinafter described.

As the mandrel 31 completes a revolution, the trailing edge of the blank overlaps the leading edge to form a lap seam for the cylinder. The seam is made by heat and some pressure in bonding the overlapped regions of plastic together, in a liquid-tight seam extending the full height of the sleeve accomplished by bringing heater 40 into contact with these overlapped areas of the sleeve 17. Heater 40 has a surface layer 40a of Teflon material to prevent sticking of the heater nose on the sleeve. Heater 40 is pressed against the overlapped plastic sheet and the combined heat and pressure of heater 40 irons the lap seam into substantially less than the double thickness of the overlap. This forms a feathered edge compatable with the thickness of the remainder of sleeve 17. Heater 40 is on an appropriate carriage to be brought into and out of contact with the sleeve at the proper time and rotation of mandrel 31 during pressure contact of heater 40 as it irons the seam of sleeve 17.

As an alternative, the lap-seam may be made with a hot melt adhesive applied to the inner surface of the blank 18, such as in the area between edge 20 (FIG. 5) and phantom line A. Heater 40 will activate the adhesive area and form an adhesive bond between the overlapped ends of the material on mandrel 31.

To fabricate a two-piece cup from a sleeve 17, produced as has heretofore been described, there is provided a forming mandrel shown generally at 41 in FIG. 6. Mandrel 41 has an exterior surface 41a which is contoured to correspond to the desired contour of the interior surface of the cup 11 which is to be formed therefrom, or at least the sidewall portion, and the mandrel is suspended from a support member 42. A sleeve 17 which is to be formed on mandrel 41 is telescoped thereover with the upper end of sleeve 17 being held in a position aligned with the maximum dimension of forming surface 41a by means of an expansible clamping ring 43. Clamping ring 43 comprises a series of arcuate sleeve contacting segments extending inwardly from an O-shaped spring, and clearance is provided between the clamping ring and the surrounding structure to provide for radial expansion of the sleeve to accommodate the insertion of the end of a sleeve between the inner ends of such segments and the terminal portion of the forming surface 41a of mandrel 41. Clamping ring 43 is retained in a fixed position relative to the axis of mandrel 41 in a cavity 48 of support member, to the bottom of which is attached a removable flange 49 on which clamping ring 43 slidably rests.

As is shown in FIG. 7, when sleeve 17 is positioned over the forming surface 41a of mandrel 41, the so positioned elements are exposed to a source of heat, as by advancing them in unison into a region, exposed to infra-red heating elements 51,52 and 53, elements 51 and 52 being directed against opposed sides of mandrel 41 and element 53 being directed against the bottom thereof. For purposes of illustration, elements 51–55 may be considered to be electric elements of the type manufactured by Irex Corporation of Riverdale, New Jersey and sold as Radplane radiant process heaters. As an alternative to heating by way of infra-red elements, it is also contemplated that the so positioned sleeve and mandrel could be heated by advancing them through a tunnel through which heated air is circulated. However, infra-red heating has been found to be more controllable and, because of the penetrative effect of the infra-red radiation, somewhat faster than forced convection heating. In any event, the application of heat will cause the portion 17a of sleeve 17 which overlies the side portion of the surface 41a to shrink into tight conforming relationship therewith.

To avoid chilling of the interior surface of the sleeve during shrinking which would, of course, inhibit shrinking, it has been found desirable that the mandrel be at an elevated temperature during the shrinking step, but not at a temperature higher than the softening point of the thermoplastic material from which the sleeve is formed. With sleeves formed from expanded polystyrene, good results have been obtained with a mandrel pre-heated to a temperature of the order of 150° F.

Prior to the exposure of sleeve 17 to the heating effect of heating elements 51,52 and 53, a disc shaped element of thermoplastic material 71, from which bottom element 16 of the finished cup is to be formed, is brought into position against the bottom of mandrel 41 in coaxial relationship to sleeve 17. Element 16 is retained in such position during the heating step by vacuum applied thereagainst through a circumferential series of ports 44 which are in fluid communication with vacuum line passages 45 and 46 extending through a central spindle portion 47 of mandrel 41 and, in turn, communicating with a vacuum source, not shown, external to the mandrel. The use of a pair of such vacuum line passages, 45 and 46, makes it possible to maintain a vacuum in the annular space defined by the outer surface 41a of mandrel 41 and the central spindle 47 thereof. While such vacuum is not utilized in the illustrated embodiment of the invention, it can be utilized to advantage by providing vacuum ports through the surface 41a to help in the forming of sharp corners in an upper portion of the finished cup, as in the case of a cup having a stacking rim in an upper portion thereof or a cup formed from very thin and/or very low density material and thereby requiring a circumferentially extending stiffening rib near the upper portion thereof.

Figure 8:
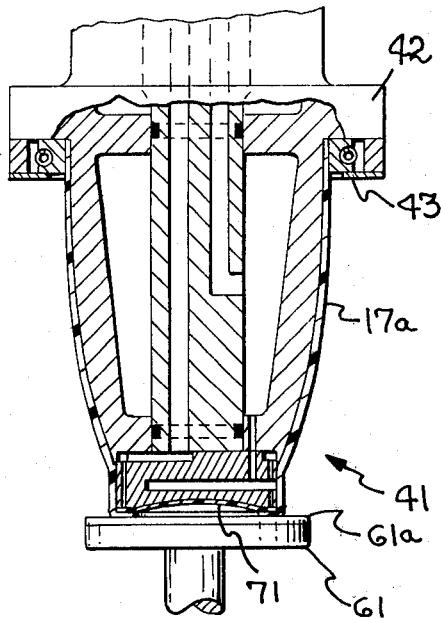

While the portion of sleeve 17 which overlies the side portion of the surface 41a of mandrel has shrunk into conformity therewith, as heretofore explained, the terminal portion of sleeve 17 which extends beyond the smaller end of the mandrel 41 will continue to shrink to form an annular, generally planar portion 17b which is integral with, and extends inwardly from the smaller end of portion 17a, and which overlaps the marginal portion of element 71 in a continuous, circumferential pattern. In the meanwhile, the interior portion of element 71 will permanently shape itself to conform to the concave curvature of the bottom of mandrel 41 by the effect of the heat and vacuum forces to which it is exposed, some vacuum naturally bleeding from ports 44 into the region above the interior portion of element 71. After the shrinking operation, the mandrel 41 with the shrunken sleeve 17 and the shaped bottom element 71 thereon is removed from exposure to heating elements 51, 52 and 53 and, as is shown in FIG. 8, a heated sealing tool 61, with a non-stick contact surface layer 61a such as a woven glass fabric, for example, of the type sold under the designation Flour glass, which is impregnated with Teflon resin or other non-stick material, is brought into pressing contact therewith to form a continuous, circumferentially extending, liquid tight heat seal between portion 17b of sleeve 17 and the underlying marginal portion of element 71.

After the seal has been effected between portion 17b of sleeve 17 and the underlying portion of element 71, as has been described, the shrunken sleeve is stripped from the mandrel and is further processed in a conventional manner, for example, by rolling the rim 15 therein by means of conventional rim forming devices, by inspecting finished cups and by collecting and packaging a multiplicity of like cups in nested relationship with one another.

Figure 9:
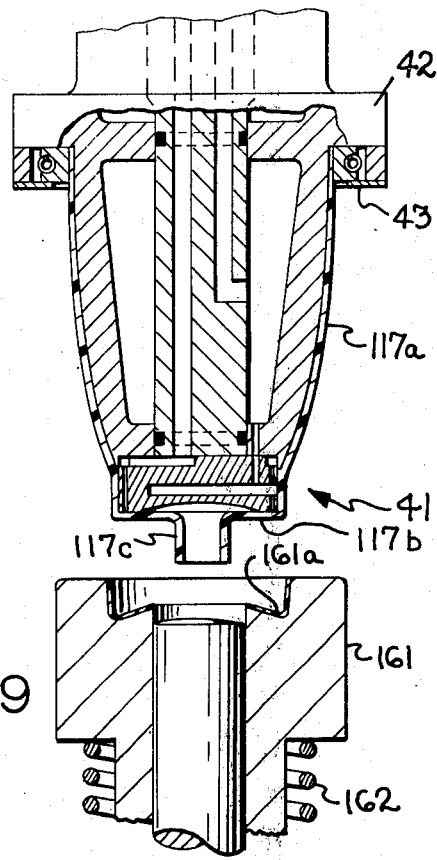
FIGS. 9 and 10 are schematic views illustrating sequential steps in the fabricating of a one-piece container.
Figure 10:
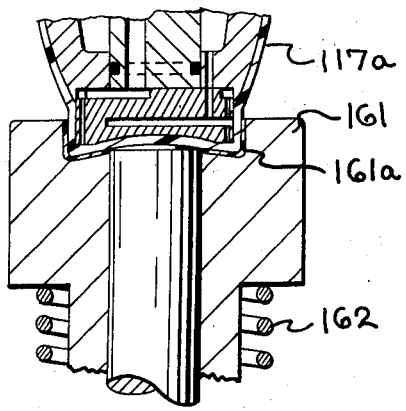

A cup of the type shown in FIGS. 1 and 2 may also be formed of one-piece construction, as well as of two-piece construction as heretofore described. Such a cup may be constructed, as is shown in FIGS. 9 and 10, from a sleeve 117 which is the same as sleeve 17 except that it is longer and has a relatively long portion adapted to extend beyond the smaller end of the forming mandrel, which may be considered to the forming mandrel depicted in FIGS. 6–8. In such a case the starting sleeve from which the cup is to be formed is of sufficient length to have a substantial portion which extends beyond the smaller end of the mandrel 41 when the upper edge of such sleeve is in its aligned position with the upper portion of the forming surface of the mandrel. Upon the heat-shrinking of such a sleeve, as is shown in FIG. 9, will form a member with a sidewall portion 117a, a generally planar annular portion 117b integral with portion 117a and extending radially inwardly from the lowermost edge thereof, and a relatively small tubulation 117c which extends longitudinally from the interior edge of the planar portion 117b and which is integral with sidewall portion 117a and annular portion 117b. The bottom of a cup may be formed in the shrunken member 117, preferably while such member is still on the mandrel, by the application of heat and pressure to the bottom of such member to cause the tubulation to 117c to collapse and fuse together with planar portion 117b. This may be done by means of a pressing and shaping tool 161 which has a contoured surface adapted to contact the bottom of the shrunken sleeve and to shape it to the desired final configuration. Tool 161 is normally in a non-contacting position relative to mandrel 41, as is shown in FIG. 9, and it may be urged from such position into the sealing and pressing position depicted in FIG. 10 by the action of a spring 162. As the shrunken sleeve 117 on mandrel 41 may not be at a sufficiently high temperature at the time that tool 161 is brought into contact therewith to permit the sealing and pressing operation to be performed without additional heat, tool 161 may be considered to be heated by means, not shown, and to have its contact surface covered with a material 161a of the type used in regard to the contact surface 61a of the tool 61 of FIG. 8, as heretofore described. In case that the bottom sealing step in the manufacture of either the two-piece cup, as is shown in FIG. 8, or of the one-piece cup, as is shown in FIGS. 9 and 10, is done while the shrunken sleeve elements are at a sufficiently high temperature to obviate the need for additional means to heat the applicable sealing tool, an unheated sealing tool may be used, in which case it will normally be unnecessary to coat the contact surfaces of the sealing tools with the special non-stick material of surfaces 61a or 161a, as the case may be.

In general, it is recommended, for good stacking characteristics, that the sidewall taper of cups or other nestable container constructed in accordance with the present invention increase from a taper of the order of 5° – 7° at the top thereof to a taper of the order of at least 15° at the bottom thereof. To obtain a good balance between performance and cost, for a cup of the order of size of a single serving of coffee or other hot beverage and based on current economic conditions, a starting or parent sheet of expanded polystyrene of a thickness of the order of 20 to 30 mils of a density of the order of 10 to 18 pounds per cubic foot, and with an orientation in the longer or machine direction of the order of 75% and an orientation in the shorter or cross direction of the order of 15% is preferred with sheets of a density of the order of 10 pounds per cubic foot and a thickness of the order of 25 mils (0.025 in.) being highly satisfactory for the fabrication of single serving hot drink cups. However, while heat-shrinkable, expanded polystyrene is currently the preferred material for the fabrication of insulated cups and other nestable containers according to the present invention, such preference is based mainly on the cost of polystyrene relative to other thermoplastic resins. Such cost relationships could change with the passage of time, and it is therefore to be noted that other heat-shrinkable, expanded thermoplastic materials can, from a technical point of view, be employed in the practice of the invention, including such materials as polypropylene, polyethylene and polyvinyl chloride. It is also to be noted that cups constructed in accordance with the present invention can be used as cold drink cups, where the insulating properties would not be as important, but would still be of value in preventing moisture from condensing on the outer surfaces. In the case of cups or other containers designed for holding cold drinks or for other fluent products at ambient temperature, the use of an expanded thermoplastic material would offer potential benefits, in relation to non-expanded materials, chiefly in reduced material costs.

While the invention has been described with respect to a nestable container which is circular in cross-section at all elevations, it is to be noted that other configurations can be provided to suit the wishes of the designer. For example, a nestable container which has the cross-section of a round-cornered square at all elevations can be provided, and a nestable container which has a circular cross-section at the top gradually merging into the cross-section of a round-cornered square at the bottom can be provided. Also, where close nesting is not required, an attractive nestable container with a sidewall having a reverse curvature, similar to the popular "Coke" tumbler, can be provided. Containers which are non-symmetrical can also be provided.

It is also to be noted that the present invention can be practiced with non-expanded, heat-shrinkable thermoplastic materials in cases where the nestable cups or other containers do not require thermal insulating characteristics. Such containers would still have advantages over containers formed from such materials by vacuum forming or other sheet drawing techniques, in regard to the ease and relatively low cost with which the sidewall thereof could be decorated. Also, by virtue of the mode of manufacture thereof, such containers, being fabricated from rectangular blanks, would involve a considerably lower amount of scrap to be reground and recycled, and would inherently avoid the problem of excessive thinning in the sidewall region near the bottom which is characteristic of such containers when formed by any such popular sheet drawing technique and which, in regard to relatively tall, narrow containers, can lead to a significant reduction in the strength in the bottom regions of the sidewalls of such containers.

It is thought that the invention may be better understood from the following example, which is not to be construed as limiting the scope of the invention in any way.

EXAMPLE

The sidewalls of two-piece cups of the outline of that shown in FIG. 1 were constructed from pre-printed rectangular blanks of 10 lbs. per cu. ft. density polystyrene, 9⅝ in. long by 4 in. wide by 25 mil (0.025 in.) thick, such blank having 75% orientation in the longer or machine direction and 15% orientation in the shorter or cross direction. The bottom elements were fabricated from polystyrene sheeting of the same specifications. Each finished cup had an overall height of 3.448 in., and I.D. at the rim of 2.920 in. and I.D. inside of the stacking shoulder of 1.892 in., wall thickness, at the rim, of 30 mils. a wall thickness, immediately above the stacking shoulder, in excess of 40 mils, a curved sidewall curving along the arc of a circle of a radius of 12⅝ in. from a taper of 5° 30′ at the rim, and an O.D. over the rim of 3.155 inches. The stacking distance or height between the bottoms of like cups in a nested relationship was 0.390 inch. Each such cup had a volumetric capacity to overflowing of 9 fl. oz. and such cups were found to be very well suited, in rigidity, liquid impermeability and insulating properties for hot beverages such as coffee. Cups of similar design have also been satisfactorily constructed from expanded polystyrene sheets of the following thicknesses and densities: 1) 18 lb. per cu. ft. and 25 mil, 2) 10 lb. per cu. ft. and 30 mil, 3) 15 lb. per cu. ft. and 20 mil and 4) 18 lb. per cu. ft. and 25 mil.

But for some differential post-expansion of the foam sheet which is apparently caused by differential application of heat thereto and which led to some increase in density in the sidewall of the cup in the region of the rim, the density of the cup sidewall remained relatively uniform throughout. As a result, it could be fairly said that the product of sidewall circumference at any elevation and thickness at that elevation remained relatively constant through a major portion of the cup.

The invention, and an operative embodiment thereof, has been described above in terms sufficiently full, clear, concise and exact as to enable any person skilled in the art to make and use the same. It is to be understood, however, that it is within our contemplation that certain modifications of the above-described mode of practicing the invention can be made by a skilled artisan without departing from the scope of the invention and it is, therefore, desired to limit the invention only in accordance with the appended claims.

We claim:

1. A nestable cup-like container comprising, in combination: a sidewall formed by heat shrinking a sleeve formed from a single double-ended sheet of a heat-shrinkable thermoplastic material, and having an inner surface adapted to contact a liquid product to be contained in said container, the ends of said sheet being joined to one another to form a liquid-tight seam extending from the top to the bottom of said container, said container having a mouth at its top which is defined by the upper portion of the sidewall, said sidewall continuously and progressively tapering inwardly and downwardly from a point near the open mouth of the container to a point near the bottom of the container for a major portion of the height of the container, the height of said major portion constituting substantially more than one-half of said container, the thickness of the sidewall increasing continuously and progressively over said major portion from a lesser thickness at the top to a greater thickness at the bottom thereof as a result of the heat shrinking of the sleeve; and means joined to the sidewall for closing the bottom of the container in a liquid-tight manner.

2. A container according to claim 1 where said heat-shrinkable thermoplastic material is an expanded, heat-shrinkable thermoplastic material.

3. A two-piece container according to claim 1 wherein the means for closing the bottom of the container is a piece which is separate from the unitary sidewall and which is sealingly joined thereto.

4. A container according to claim 1 wherein the uppermost portion of the double-ended blank from which the sidewall is formed is reversely folded into a relatively thin, tight bead which surrounds the mouth of the container.

5. A container according to claim 2 wherein said expanded heat-shrinkable thermoplastic material comprises polystyrene of an average density of the order of 10 to 18 pounds per cubic foot.

6. A container in accordance with claim 5 wherein the thickness of the sidewall of such container, at an elevation proximate to the upper open end thereof, is of the order of 20–30 mils.

7. A container according to claim 2 wherein the taper of the major portion of the sidewall increases from a minimum taper at an upper, thinner region of said major portion to a greater taper at a lower, thicker region thereof.

8. A container according to claim 7 wherein said taper is of the order of 5°–7° at the upper region of the major portion of the sidewall and is of the order of at least 15° at the lower region thereof.

9. A container according to claim 7 wherein said taper increases progressively from said minimum taper to said greater taper along the distance from said upper region to said lower region.

10. A container according to claim 1 wherein the sidewall is provided with an inwardly extending shoulder at a location outside of said major portion against which a portion of a substantially identical container is adapted to abut when said substantially identical container is inserted into said container in nested relationship to maintain a predetermined minimum spacing between said containers.

11. A pair of substantially identical containers each of which is constructed in accordance with claim 10, one of said containers being inserted in the other in nested relationship with said portion of said container abutting against the said shoulder of the other container.

12. A container according to claim 10 wherein said inwardly extending shoulder is located in said sidewall at a location below said major portion, and wherein the portion of a substantially identical container is an annular portion of the bottom thereof.

13. A pair of substantially identical containers each of which is constructed in accordance with claim 12, one of said containers being inserted in the other in nested relationship with said annular portion of the bottom of said container abutting against the said shoulder of the other container.

14. A container according to claim 2 wherein the ends of the sheet of thermoplastic material are joined to one another in an overlapped relationship, and wherein the sidewall is of a reduced thickness and increased density in the region of the overlapping ends.

15. The combination comprising a container according to claim 1 and a liquid container therein, said liquid being in face to face contact with the inner surface of the sidewall of the container.

16. The combination according to claim 15 wherein the heat-shrinkable thermoplastic material is an expanded, heat-shrinkable thermoplastic material and wherein the liquid is a hot beverage.

17. A one-piece nestable cup-like container comprising, in combination: a sidewall formed by heat-shrinking a sleeve formed from a single double-ended sheet of a heat-shrinkable thermoplastic material, and having an inner surface adapted to contact a liquid product to be contained in said container, the ends of said sheet being joined to one another to form a liquid-tight seam extending from the top to the bottom of said container, said container having a mouth at its top which is defined by the upper portion of the sidewall, said sidewall continuously and progressively tapering inwardly and downwardly from a point near the open mouth of the container to a point near the bottom of the container for a major portion of the height of the container, the height of said major portion constituting substantially more than one-half of said container, the thickness of the sidewall increasing continuously and progressively over said major portion from a lesser thickness at the top to a greater thickness at the bottom thereof as a result of the heat shrinking of the sleeve; and means closing the bottom of the container which means comprises an inwardly folded lowermost integral portion of the double-ended sheet from which the sidewall is formed.

* * * * *

UNITED STATES PATENT OFFICE
CERTIFICATE OF CORRECTION

PATENT NO. : 3,995,740
DATED : December 7, 1976
INVENTOR(S) : Stephen W. Amberg and Thomas E. Doherty It is certified that error appears in the above—identified patent and that said Letters Patent are hereby corrected as shown below:

Col. 3, line 18, after "thickness" insert --at the location of greatest diameter to a greater thickness--.

Col. 5, line 52, change "line" to --lines--.

Signed and Sealed this

Eighth Day of March 1977

[SEAL]

Attest:

RUTH C. MASON
Attesting Officer

C. MARSHALL DANN
Commissioner of Patents and Trademarks